US012182022B2

United States Patent
Radi et al.

(10) Patent No.: US 12,182,022 B2
(45) Date of Patent: Dec. 31, 2024

(54) IN-KERNEL CACHE REQUEST QUEUING FOR DISTRIBUTED CACHE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Tehcnologies, Inc., San Jose, CA (US)

( * ) Notice: Subject to any disclaimer, the term of this patent is extended or adjusted under 35 U.S.C. 154(b) by 137 days.

(21) Appl. No.: 17/741,244

(22) Filed: May 10, 2022

(65) Prior Publication Data

US 2023/0367713 A1 Nov. 16, 2023

(51) Int. Cl.
*G06F 3/06* (2006.01)
*G06F 12/0817* (2016.01)
*G06F 12/084* (2016.01)

(52) U.S. Cl.
CPC ............ *G06F 12/084* (2013.01); *G06F 3/061* (2013.01); *G06F 3/0659* (2013.01); *G06F 3/0679* (2013.01); *G06F 12/0824* (2013.01); *G06F 2212/621* (2013.01)

(58) Field of Classification Search
CPC ............... G06F 12/0824; G06F 12/084; G06F 2212/621; G06F 3/061; G06F 3/0659; G06F 3/0679
See application file for complete search history.

(56) References Cited

U.S. PATENT DOCUMENTS

| 8,412,907 B1 | 4/2013 | Dunshea et al. |
| 8,700,727 B1* | 4/2014 | Gole ...................... H04L 67/104 709/213 |
| 10,027,697 B1 | 7/2018 | Babun et al. |

(Continued)

FOREIGN PATENT DOCUMENTS

| CN | 106603409 A | 4/2017 |
| CN | 112351250 A | 2/2021 |

(Continued)

OTHER PUBLICATIONS

Ghigoff et al., "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.

(Continued)

*Primary Examiner* — Yong J Choe
(74) *Attorney, Agent, or Firm* — Barry IP Law, P.C.

(57) ABSTRACT

A node includes at least one memory for use as a shared cache in a distributed cache. One or more other nodes on a network each provide a respective shared cache for the distributed cache. A request is received by a kernel of the node to access data in the shared cache and an Input/Output (I/O) queue is identified from among a plurality of I/O queues in a kernel space of the at least one memory for queuing the received request based on at least one of a priority indicated by the received request and an application that initiated the request. In another aspect, each I/O queue of the plurality of I/O queues corresponds to at least one of different respective priorities for requests to access data in the shared cache and different respective applications initiating requests to access data in the shared cache.

20 Claims, 6 Drawing Sheets

(56) References Cited

U.S. PATENT DOCUMENTS

| | | | |
|---|---|---|---|
| 10,362,149 | B2 | 7/2019 | Biederman et al. |
| 10,530,711 | B2 | 1/2020 | Yu et al. |
| 10,628,560 | B1* | 4/2020 | Siranni .............. G06F 21/6281 |
| 10,754,707 | B2 | 8/2020 | Tamir et al. |
| 10,757,021 | B2 | 8/2020 | Man et al. |
| 11,134,025 | B2 | 9/2021 | Billore et al. |
| 11,223,579 | B2 | 1/2022 | Lu |
| 2005/0257263 | A1 | 11/2005 | Keohane et al. |
| 2006/0101466 | A1 | 5/2006 | Kawachiya et al. |
| 2007/0067840 | A1 | 3/2007 | Young |
| 2009/0249357 | A1 | 10/2009 | Chanda et al. |
| 2014/0143365 | A1 | 5/2014 | Guerin et al. |
| 2015/0006663 | A1 | 1/2015 | Huang |
| 2015/0319237 | A1 | 11/2015 | Hussain et al. |
| 2017/0163479 | A1 | 6/2017 | Wang et al. |
| 2017/0269991 | A1 | 9/2017 | Bazarsky et al. |
| 2018/0191632 | A1 | 7/2018 | Biederman et al. |
| 2018/0341419 | A1 | 11/2018 | Wang et al. |
| 2018/0357176 | A1 | 12/2018 | Wang |
| 2019/0227936 | A1 | 7/2019 | Jang |
| 2019/0280964 | A1 | 9/2019 | Michael et al. |
| 2020/0034538 | A1 | 1/2020 | Woodward et al. |
| 2020/0201775 | A1 | 6/2020 | Zhang et al. |
| 2020/0274952 | A1 | 8/2020 | Waskiewicz et al. |
| 2020/0285591 | A1 | 9/2020 | Luo et al. |
| 2020/0322287 | A1 | 10/2020 | Connor et al. |
| 2020/0403905 | A1 | 12/2020 | Allen et al. |
| 2020/0409821 | A1 | 12/2020 | Terada et al. |
| 2021/0019197 | A1 | 1/2021 | Tamir et al. |
| 2021/0058424 | A1 | 2/2021 | Chang et al. |
| 2021/0149763 | A1 | 5/2021 | Ranganathan et al. |
| 2021/0157740 | A1 | 5/2021 | Benhanokh et al. |
| 2021/0240621 | A1 | 8/2021 | Fu et al. |
| 2021/0266253 | A1 | 8/2021 | He et al. |
| 2021/0320881 | A1 | 10/2021 | Coyle et al. |
| 2021/0377150 | A1 | 12/2021 | Dugast et al. |
| 2022/0035698 | A1 | 2/2022 | Vankamamidi et al. |
| 2022/0121362 | A1* | 4/2022 | Liu .................. G06F 3/0604 |
| 2022/0294883 | A1 | 9/2022 | Pope et al. |
| 2022/0350516 | A1 | 11/2022 | Bono et al. |
| 2022/0357886 | A1 | 11/2022 | Pitchumani et al. |

FOREIGN PATENT DOCUMENTS

| | | |
|---|---|---|
| EP | 3358456 A1 | 8/2018 |
| EP | 3598309 B1 | 5/2022 |
| KR | 1020190090331 A | 8/2019 |
| WO | 2018086569 A1 | 5/2018 |
| WO | 2018145725 A1 | 8/2018 |
| WO | 2021226948 A1 | 11/2021 |

OTHER PUBLICATIONS

International Search Report and Written Opinion dated Sep. 30, 2022 from International Application No. PCT/US2022/029527, 9 pages.

Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.

Pinto et al; "Hoard: A Distributed Data Caching System to Accelerate Deep Learning Training on the Cloud"; arXiv; Dec. 3, 2018; available at: https://arxiv.org/pdf/1812.00669.pdf.

International Search Report and Written Opinion dated Oct. 7, 2022 from International Application No. PCT/US2022/030044, 10 pages.

Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.

Pending U.S. Appl. No. 17/829,712, filed Jun. 1, 2022, entitled "Context-Aware NVMe Processing in Virtualized Environments", Marjan Radi.

Pending U.S. Appl. No. 17/836,927, filed Jun. 9, 2022, entitled "Resource Allocation in Virtualized Environments", Marjan Radi.

Pending U.S. Appl. No. 17/850,767, filed Jun. 27, 2022, entitled "Memory Coherence in Virtualized Environments", Marjan Radi.

Tu et al.; "Bringing the Power of eBPF to Open vSwitch"; Linux Plumber 2018; available at: http://vger.kernel.org/lpc_net2018_talks/ovs-ebpf-afxdp.pdf.

Pfaff et al.; "The Design and Implementation of Open vSwitch"; Usenix; May 4, 2015; available at: https://www.usenix.org/conference/nsdi15/technical-sessions/presentation/pfaff.

Gao et al.; "OVS-CAB: Efficient rule-caching for Open vSwitch hardware offloading"; Computer Networks; Apr. 2021; available at:https://www.sciencedirect.com/science/article/abs/pii/S1389128621000244.

Patterson et al.; "Computer Architecture: A Quantitative Approach"; 1996; Morgan Kaufmann; 2nd ed.; pp. 378-380.

International Search Report and Written Opinion dated Nov. 18, 2022 from International Application No. PCT/US2022/030437, 10 pages.

Bijlani et al.; "Extension Framework for File Systems in User space"; Jul. 2019; Usenix; available at: https://www.usenix.org/conference/atc19/presentation/bijlani.

Brad Fitzpatrick; "Distributed Caching with Memcached"; Aug. 1, 2004; Linux Journal; available at: https://www.linuxjournal.com/article/7451.

Roderick W. Smith; "The Definitive Guide to Samba 3"; 2004; APress Media; pp. 332-336; available at: https://link.springer.com/book/10.1007/978-1-4302-0683-5.

Wu et al.; "NCA: Accelerating Network Caching with express Data Path"; Nov. 2021; IEEE; available at https://ieeexplore.ieee.org/abstract/document/9680837.

Bachl et al.; "A flow-based IDS using Machine Learning in EBPF"; Cornell University; Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/350182568_Kernel-level_tracing_for_detecting_stegomalware_and_covert_channels_in_Linux_environments.

Dimolianis et al.; "Signature-Based Traffic Classification and Mitigation for DDoS Attacks Using Programmable Network Data Planes"; IEEE Access; Jul. 7, 2021; available at: https://ieeexplore.ieee.org/stamp/stamp.jsp?arnumber=9511420.

Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Baidya et al.; "eBPF-based Content and Computation-aware Communication for Real-time Edge Computing"; IEEE International Conference on Computer Communications (Infocom Workshops); May 8, 2018; available at https://arxiv.org/abs/1805.02797.

(56) References Cited

OTHER PUBLICATIONS

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2 _. pdf.

Kourtis et al.; "Safe and Efficient Remote Application Code Execution on Disaggregated NVM Storage with eBPF"; Feb. 25, 2020; 8 pages; available at https://arxiv.org/abs/2002.11528.

Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.

Pending U.S. Appl. No. 17/561,898, filed Dec. 24, 2021, entitled "In-Kernel Caching for Distributed Cache", Marjan Radi.

Pending U.S. Appl. No. 17/571,922, filed Jan. 10, 2022, entitled "Computational Acceleration for Distributed Cache", Marjan Radi.

Pending U.S. Appl. No. 17/665,330, filed Feb. 4, 2022, entitled "Error Detection and Data Recovery for Distributed Cache", Marjan Radi.

Pending U.S. Appl. No. 17/683,737, filed Mar. 1, 2022, entitled "Detection of Malicious Operations for Distributed Cache", Marjan Radi.

maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

International Search Report and Written Opinion dated Oct. 25, 2022 from International Application No. PCT/US2022/030414, 11 pages.

Sabella et al.; "Using eBPF for network traffic analysis"; available at: Year: 2018; https://www.ntop.org/wp-content/uploads/2018/10/Sabella.pdf.

* cited by examiner

IN-KERNEL CACHE REQUEST QUEUING FOR DISTRIBUTED CACHE

CROSS-REFERENCE TO RELATED APPLICATIONS

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/571,922 titled "COMPUTATIONAL ACCELERATION FOR DISTRIBUTED CACHE", filed on Jan. 10, 2022, which is hereby incorporated by reference in its entirety. This application is also related to U.S. application Ser. No. 17/665,330 titled "ERROR DETECTION AND RECOVERY FOR DISTRIBUTED CACHE", filed on Feb. 4, 2022, which is hereby incorporated by reference in its entirety. This application is also related to U.S. application Ser. No. 17/683,737 titled "DETECTION OF MALICIOUS OPERATIONS FOR DISTRIBUTED CACHE", filed on Mar. 1, 2022, which is hereby incorporated by reference in its entirety.

BACKGROUND

Current trends in cloud computing, big data, and Input/Output (I/O) intensive applications have led to greater needs for high performance distributed shared memory systems in terms of low latency, high throughput, and bandwidth. In addition, the growth of real-time and interactive big data applications relies on fast and high-performance memory. Non-Volatile Memory express (NVMe) is an emerging host controller interface originally designed for Peripheral Component Interface express (PCIe)-based Solid State Drives (SSDs) to provide increased performance in terms of Input/Output Operations Per Second (IOPS). Due to the superior performance of NVMe technology in terms of latency and bandwidth, it is becoming the new industry standard for both client devices and data center servers.

Although NVMe can provide low-latency data access, new hardware and software co-design architectures are generally needed to take full advantage of NVMe and support high-speed remote memory access. In this regard, the increase in bandwidth of network devices, such as network interfaces and switches, has increased the overhead on processors, such as Central Processing Units (CPUs). In addition, there is a relatively high Input/Output (I/O) overhead for distributed caches and a need to provide more flexibility in processing I/O cache requests for diverse workloads and applications in today's data centers.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
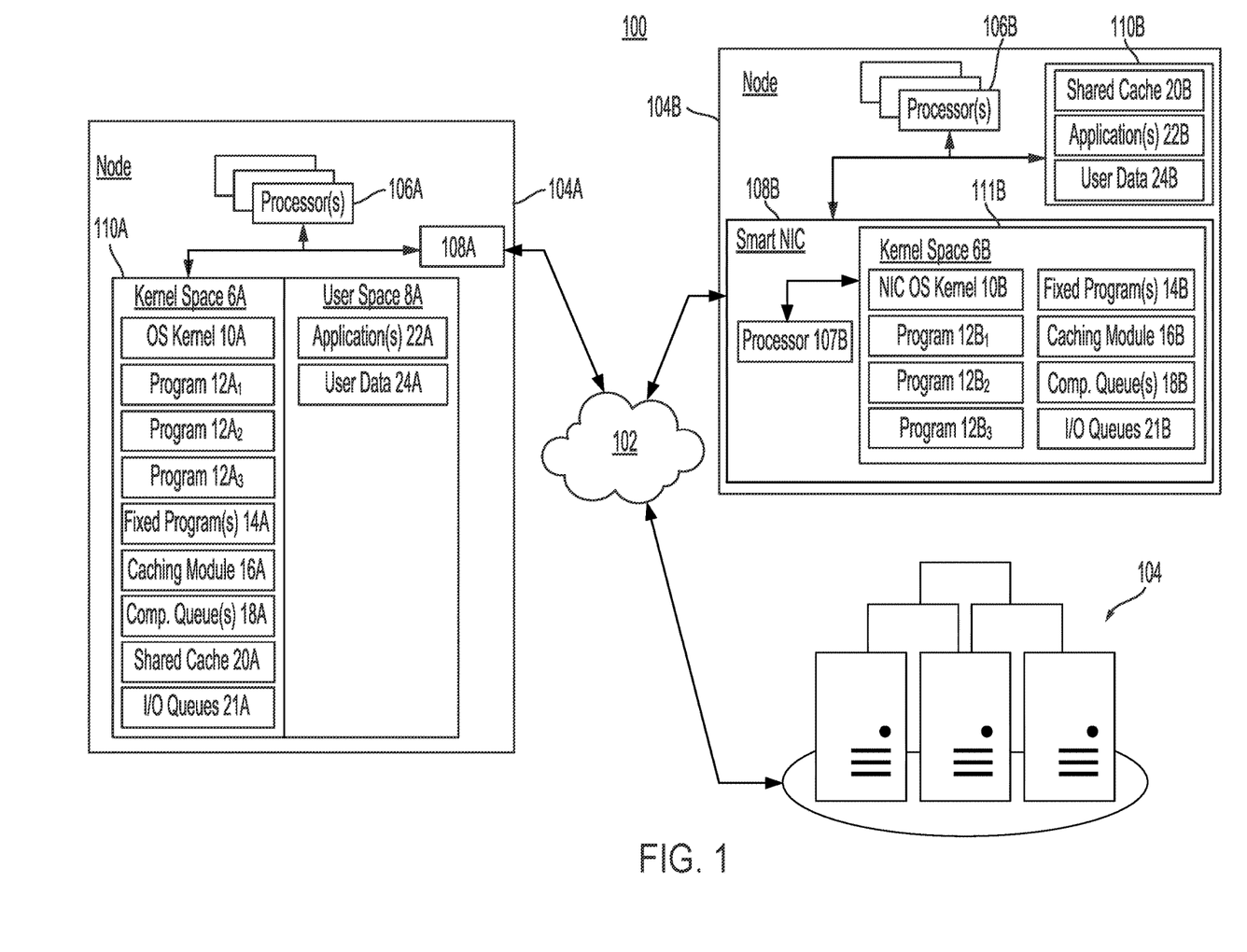
FIG. 1 is a block diagram of an example network environment for implementing in-kernel request queuing for a distributed cache according to one or more embodiments.

FIG. 1 illustrates an example network environment 100 for implementing in-kernel cache request queuing for a distributed cache according to one or more embodiments. As shown in FIG. 1, nodes 104 communicate with each other via network 102. Nodes 104 may function as, for example, servers or processing nodes and/or memory nodes. As a processing node or compute node, a node 104 can include one or more processors 106, such as Reduced Instruction Set Computer (RISC)-V cores or other type of Central Processing Unit (CPU) to process data, such as for a distributed application. As a memory node, a node 104 provides a shared cache that may be accessed by other nodes on network 102 and form part of a distributed cache shared among nodes on network 102.

In some cases, some of nodes 104 may function as, for example, storage nodes that store data that can be accessed by nodes 104 and cached locally in a shared cache that forms part of the distributed cache. In this regard, some of nodes 104 can include, for example, one or more rotating magnetic disks, and/or non-volatile solid-state memory, such as flash memory. In some implementations, a single node 104 may include one or more Solid-State Drives (SSDs) and/or Hard Disk Drives (HDDs). As discussed in more detail below, data retrieved from nodes or processed by nodes 104 can be cached in respective shared caches 20 at nodes 104 that form the distributed cache to provide faster access to the cached data as compared to retrieving data from storage devices of remote and/or local nodes 104.

In some implementations, network environment 100 in FIG. 1 may be used as at least part of a data center and/or for distributed processing, such as for distributed machine learning or big data analysis. As will be appreciated by those of ordinary skill in the art, nodes 104 are shown for the purposes of illustration, and network environment 100 can include many more nodes 104 than those shown in FIG. 1. In addition, those of ordinary skill the art will appreciate that network environment 100 can include more components than shown in FIG. 1, such as aggregated switches, Top of Rack (ToR) switches, and network controllers, for example.

Network 102 can include, for example, a Storage Area Network (SAN), a Local Area Network (LAN), and/or a Wide Area Network (WAN), such as the Internet. In this regard, nodes 104 may not be in the same geographic location. Nodes 104 may communicate using one or more standards such as, for example, Ethernet.

Each of nodes 104A and 104B in the example of FIG. 1 includes one or more processors 106, a network interface 108, and a memory 110. These components of nodes 104 may communicate with each other via a bus, which can include, for example, a Peripheral Component Interconnect express (PCIe) bus. In some implementations, nodes 104 may include Non-Volatile Memory express over Fabric (NVMeoF) nodes that are configured to communicate with other nodes 104 using NVMe messages (e.g., NVMe commands and responses) that may be, for example, encapsulated in Ethernet packets using Transmission Control Protocol (TCP). In this regard, network interfaces 108A and 108B of nodes 104A and 104B, respectively, may include Network Interface Cards (NICs), network interface controllers, or network adapters.

In the example of FIG. 1, node 104B includes smart NIC 108B as its network interface. As discussed in more detail below, smart NIC 108B includes its own processor 107B and memory 111B that can be used for performing in-kernel Input/Output (I/O) cache request queuing as disclosed herein and other in-kernel operations, such as computational operations. This arrangement can improve the performance of node 104B by offloading such operations from a processor 106B of node 104B to Smart NIC 108B. In some implementations, smart NIC 108B may also serve as an NVMe controller for controlling operation of memory 110B, which can be an NVMe device.

Processors 106 and 107B in FIG. 1 can execute instructions, such as instructions from one or more applications (e.g., applications 22) or programs (e.g., programs 12, fixed programs 14) loaded from memory 110 or 111B, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111B can include, for example, a volatile Random Access Memory (RAM) such as Static RAM (SRAM), Dynamic RAM (DRAM), or a non-volatile RAM, or other solid-state memory that is used by processors 106 or 107B. Data stored in memory 110 or memory 111B can include data read from another node 104, data to be stored in another node 104, instructions loaded from an application or from an OS for execution by the processor, and/or data used in executing such applications, such as user data 24.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof.

In other implementations, memory 110 or 111B may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memory 110A of node 104A includes a kernel space 6A that is used by OS kernel 10A and a user space 8A that is used by one or more applications 22A, such as for accessing user data 24A. Kernel space 6A and user space 8A can include separate portions of virtual memory mapped to physical addresses in memory 110A. As will be understood by those of ordinary skill in the art, access to kernel space 6A is generally restricted to OS kernel 10A, its kernel extensions, and other portions of an OS, such as device drivers, while access to user space 8A is available to both applications 22A and the OS. In this regard, the OS of node 104A or the OS of smart NIC 108B allocates hardware and software resources, such as memory, network, and processing resources of the device.

As shown in FIG. 1, kernel space 6A includes programs $12A_1$, $12A_2$, and $12A_3$, one or more fixed programs 14A, caching module 16A, one or more completion queues 18A, shared cache 20A, and I/O queues 21A. In implementations where the OS of node 104A is Linux, programs 12A, fixed program(s) 14A, and caching module 16A can include extended Berkeley Packet Filter (eBPF) programs that are executed as an extension of the Linux kernel. Notably, eBPF can enable reprogramming of the kernel behavior without requiring changes to the kernel source code or loading a kernel module. In addition, eBPF includes a verifier to ensure safe execution of eBPF programs.

Program $12A_1$ can be used by the kernel to create I/O queues 21A for queuing cache requests to access data (i.e., read data or write data) in shared cache 20A. In some implementations, I/O queues 21A can include NVMe command queues. As discussed in more detail below with reference to FIGS. 2A to 2C, the I/O queues can be adjusted over time or created on-the-fly to better suit different workloads and applications accessing shared cache 20A. In this regard, different applications accessing the shared cache may have very different requirements in terms of Quality of Service (QoS) or different usage of the shared cache in terms of the frequency of read requests or write requests.

Program $12A_2$ can be used by the kernel to parse cache requests received by the kernel and to determine an application identifier for the application initiating the request and/or to determine a priority of the cache request. The use of such I/O queues in the kernel that can distinguish among different applications accessing shared cache 20A and/or a priority of the different cache requests can improve an overall QoS for the applications by handling the cache requests quicker than if using a user space application and can better balance the processing and memory resources of node 104A with the needs of the different applications accessing shared cache 20A.

For example, certain user space applications, either locally executed at node 104A or remotely executed at a remote node 104, may issue many cache requests that can effectively block cache requests from other applications that issue cache requests less frequently. The use of separate I/O queues for different applications can help ensure that an application with less frequent cache requests is not blocked by another application since the applications do not share the same I/O queue and the respective I/O queues can be dequeued at a particular rate. As another example, higher priority cache requests, such as for more time-sensitive applications (e.g., video applications) may have a separate queue that is serviced or dequeued more frequently than other I/O queues or has more requests dequeued at a time. In some implementations, the number of I/O queues 21A can depend on the number of runtime or active applications accessing the shared cache.

Program $12A_3$ can be used by the kernel to batch cache messages for one or more user space applications 22A when the available processing or memory resources of node 104A are below a threshold level. The cache messages can include, for example, notifications about cache requests received from remote nodes or by other locally executed user space applications, data received from other nodes 104 in accessing the distributed cache or results from performing operations on such data, and/or data stored in completion queue(s) 18A, such as data read from the local shared cache 20A or results from operations performed on such data. The batching or grouping of cache messages in the kernel space can reduce the number of interrupts and context switches that would otherwise occur by individually sending the cache messages to the one or more user space applications and thereby provide a more efficient utilization of the processing and memory resources of node 104A by the user space applications 22A.

In the example of FIG. 1, caching module 16A can enable OS kernel 10A to access data for the distributed cache in shared cache 20A that is stored in kernel space 6A, as opposed to user space 8A. As discussed in related co-pending application Ser. No. 17/561,898, which is incorporated by reference above, frequently accessed data can be stored in shared cache 20A using caching module 16A to accelerate remote memory operations at a nearly line rate without requiring special hardware or changes to the kernel in the case where caching module 16A is an eBPF program. The remote memory operations, such as read requests and write requests, can be processed at an earlier point in the kernel, as opposed to having to traverse a full network stack and full I/O stack of the kernel to finally be handled by an application in user space 8A. For example, caching module 16A may operate at a lower block device driver layer in the I/O stack, without having to pass memory requests through higher layers in the I/O stack, such as a generic block layer and file system layer of the kernel. Similarly, caching module 16A may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed caches due to faster interface standards, such as NVMeOF, and the increasing bandwidths of network hardware. Caching data for the distributed cache in kernel space 6A and performing computational operations in kernel space 6A can enable OS kernel 10A to respond quicker on behalf of user space applications 22A. Although there is some development in allowing user space applications to bypass the kernel and have direct access to storage or memory devices, such as NVMe devices, such performance improvements will come at the cost of reimplementing complicated default kernel functions in user space. In contrast, the in-kernel computational operations of the present disclosure can use a kernel extension, such as an eBPF program, that is added to or injected into the kernel without requiring changes to the kernel source code or reloading a kernel module.

Each of programs $12A_1$ and $12A_2$ can be executed by OS kernel 10A to create I/O queues 21A and determine the appropriate I/O queue from among I/O queues 21A for cache requests received from one or more applications 22A executed at node 104A and/or applications executed by another node 104. In some implementations, programs $12A_1$ and $12A_2$ can attach to a block I/O layer of OS kernel 10A to configure I/O queues 21A and identify I/O queues for received cache requests at a low level in the kernel stack to prevent having to transfer data through higher layers of OS kernel 10A.

One or more fixed programs 14A can provide predefined computational operations for a memory service provided by node 104A. Such memory services can include, for example, compression of data to be written in shared cache 20A, decompression of data read from shared cache 20A, encryption of data to be written in shared cache 20A, decryption data read from shared cache 20A, scatter-gather operations for storing data in different locations in shared cache 20A or reading data from different locations in shared cache 20A, and a data deduplication process for data read from shared cache 20A or data to be written to shared cache 20A.

In the example of FIG. 1, shared cache 20A can be used by caching module 16A to share data between kernel space 6A and user space 8A. In some implementations, shared cache 20A can include one or more eBPF maps that allow copies of data to be provided to applications 22A in user space 8A and to store data from applications 22A. Shared cache 20A can include a data structure, such as a KVS or a table, for example. The use of an eBPF map as shared cache 20A can enable different applications 22A in a user space 8A to concurrently access the data stored in the shared cache.

Completion queues 18A can include data obtained or read from shared cache 20A in performing the cache requests from I/O queues 21A. In some implementations, programs such as fixed programs 14A can fetch the obtained data from completion queues 18A at a driver level in kernel space 6A and buffer the data temporarily for performing computational operations. After calculating the result, the program can update a user space application 22A with the result or with an indication of the result using a cache message from the kernel. This arrangement in kernel space 6A can significantly reduce an I/O overhead that would otherwise be caused by sending the intermediate data through the full kernel stack for computation in user space 8A.

Node 104B differs from node 104A in the example of FIG. 1 in that node 104A uses a kernel space 6B of the memory 111B of its smart NIC 108B for creating and populating the I/O queues for accessing shared cache 20B and for performing the in-kernel cache message batching or computational operations disclosed herein. As shown in FIG. 1, smart NIC 108B includes its own processor 107B and memory 111B that are used as a hardware offload from processors 106B for operations related to the distributed cache and the data accessed in shared cache 20B. This arrangement can further improve the performance of node 104B by freeing up processing resources and memory for processors 106B.

Smart NIC 108B can include, for example, an SoC that includes both processor 107B and memory 111B. In the example of node 104B, smart NIC 108B includes its own NIC OS kernel 10B that allocates resources of smart NIC 108B and memory 110B. In some implementations, memory 110B is an NVMe memory device that stores shared cache 20B for the distributed cache in a kernel space of memory 110B and stores one or more applications 22B and user data 24B in a user space of memory 110B.

Each of programs $12B_1$, $12B_2$, and $12B_3$, one or more fixed programs 14131, caching module 16B, one or more completion queues 18B, and I/O queues 21B can be stored in a kernel space of memory 111B. In implementations where the NIC OS 10B is Linux, programs 12B, 14B, and caching module 16B can include eBPF programs that are executed as an extension of the Linux kernel.

Program $12B_1$ can be used by the kernel to create I/O queues 21B for queuing requests to access data (i.e., read data or write data) in shared cache 20B. In some implementations, I/O queues 21B can include NVMe command queues. As discussed in more detail below with reference to FIGS. 2A to 2C, the I/O queues can be adjusted over time or created on-the-fly to better suit different workloads and applications accessing shared cache 20B.

Program $12B_2$ can be used by the kernel to parse cache requests received by the kernel and determine an application identifier for the application initiating the request and/or a priority of the cache request. The use of such I/O queues in the kernel that can distinguish among different applications accessing shared cache 20B and/or a priority of the different cache requests can improve an overall QoS for the applications by handling the cache requests quicker than using a user space application and can better balance the processing and memory resources of node 104B with the needs of the different applications accessing shared cache 20B.

Program $12B_3$ can be used by the kernel to batch cache messages for one or more user space applications 22B when the available processing or memory resources of node 104B are below a threshold level. The cache messages can include, for example, notifications about cache requests received from remote nodes or by other locally executed user space applications, data received from other nodes 104 in accessing the distributed cache or results of operations performed on such data, and/or data stored in completion queue(s) 18B, such as data read from the local shared cache 20B or results from operations performed on such data. The batching or grouping of cache messages in the kernel space can reduce the number of interrupts and context switches that would otherwise occur by individually sending the cache messages to the one or more user space applications and thereby provide a more efficient utilization of the processing and memory resources of node 104B by the user space applications 22B.

Shared cache 20B can be used by caching module 16B to share data between a kernel space and a user space. In some implementations, shared cache 20B can include one or more eBPF maps that allow copies of data to be provided to applications 22B in user space and to store data from applications 22B. Shared cache 20B can include a data structure, such as a KVS or a table, for example. The use of an eBPF map as shared cache 20B can enable different applications 22B in a user space to concurrently access the data stored in the shared cache.

One or more fixed programs 14B can provide predefined computational operations for a memory service provided by node 104B. Such memory services can include, for example, compression of data to be written in shared cache 20B, decompression of data read from shared cache 20B, encryption of data to be written in shared cache 20B, decryption data read from shared cache 20B, scatter-gather operations for storing data in different locations in shared cache 20B or reading data from different locations in shared cache 20B, and a data deduplication process for data read from shared cache 20B or data to be written to shared cache 20B.

In the example of FIG. 1, shared cache 20B can be used by caching module 16B to share data between kernel space 6B and a user space of node 104B. In some implementations, shared cache 20B can include one or more eBPF maps that allow copies of data to be provided to applications 22B in a user space and to store data from applications 22B. Shared cache 20B can include a data structure, such as a KVS or a table, for example. The use of an eBPF map as shared cache 20B can enable different applications 22B in a user space to concurrently access the data stored in the shared cache.

Completion queues 18B can include data obtained or read from shared cache 20B in performing the cache requests from I/O queues 21B. In some implementations, programs such as fixed programs 14B can fetch the obtained data from completion queues 18B at a driver level in kernel space 6B and buffer the data temporarily for performing computational operations. After calculating the result, the program can update a user space application 22B with the result or an indication of the result with a cache message from the kernel. This arrangement in kernel space 6B can significantly reduce an I/O overhead that would otherwise be caused by sending the intermediate data through the full kernel stack for computation in a user space.

Those of ordinary skill in the art will appreciate with reference to the present disclosure that other implementations may include a different number or arrangement of nodes 104 than shown in the example of FIG. 1. In this regard, network environment 100 shown in FIG. 1 is for the purposes of illustration, and those of ordinary skill in the art will appreciate that network environment 100 may include many more nodes 104, and additional components, such as routers and switches, than shown in the example of FIG. 1. In addition, those of ordinary skill in the art will appreciate with reference to the present disclosure that the modules, programs, and data structures shown in FIG. 1 may differ in other implementations. For example, node 104A or smart NIC 108B can include a different number of programs 12 or fixed programs 14 than shown in FIG. 1, such as in implementations where programs $12A_1$ and $12A_2$ may be combined into a single program for creating and identifying I/O queues. As another example variation, each node 104 can include a cache directory to track information about a status or state of data in the distributed cache, such as a right of access, validity, or permission level for the cached data.

Example I/O Queues

Figure 2A:
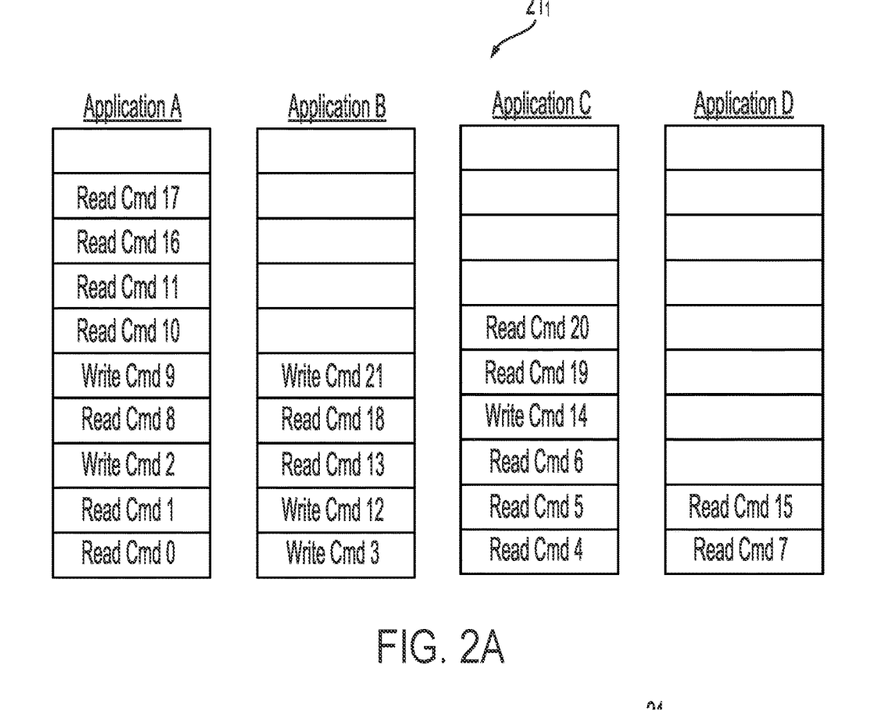
FIG. 2A illustrates an example of queuing remote and local cache requests based on the applications initiating the requests according to one or more embodiments.

FIG. 2A illustrates an example of queuing remote and local cache requests based on the applications initiating the requests according to one or more embodiments. As shown in FIG. 2A, I/O queues $21_1$ include four queues for four different applications, A, B, C, and D, that access a shared cache at a node. As noted above, separating the cache requests by application can ensure that applications that generate less cache requests are not blocked by applications that generate more cache requests. In addition, the different queues can be dequeued or serviced based on requirements for the corresponding application, such as by dequeuing read requests sooner than write requests or by dequeuing the requests to meet a minimum QoS.

In some implementations, a program executed in a kernel space of the node (e.g., program $12A_1$ or $12B_1$ in FIG. 1) can determine which applications are requesting access to the shared cache or that are still active within a predetermined window of time, and create respective I/O queues for the I/O requests that are initiated by the applications. The same program or another program executed in the kernel space (e.g., program $12A_1$ or $12B_2$ in FIG. 1) can parse cache requests received by the kernel either from a user space application of the same node or from a remote node to identify an application identifier that indicates the application requesting access to the shared cache.

The application identifier may be based, for example, at least in part on a port number for the application and an address for the node executing the application (e.g., a Media Access Control (MAC) address). In some cases, the application may be running in different processor cores. The program executed in the kernel can use the application identifier to put requests from the same application into the same I/O queue, even if the instances of the same application are being executed by different cores. This can help prevent the application blocking problem noted above, as compared to conventional I/O queuing that does not consider the application initiating the requests since an overall frequency of access of the shared cache can be determined for the application.

In the example of FIG. 2A, application A initiates the most I/O access requests. In some implementations, a program in the kernel (e.g., program $12A_2$ or $12B_2$ in FIG. 1) can select an oldest received command from one queue at a time from among the I/O queues that have pending cache requests for performance using an algorithm, such as a round-robin algorithm, to ensure equal use of the shared cache. In other implementations, the program may select the command for performance in groups of requests from one queue at a time to reduce the number of context switches. The grouping may be determined based on, for example, sequence numbers for the cache requests that may be included in a cache message or packet, as with NVMe messages that are limited to a maximum size and may need to be segmented into different cache messages. The selection of the number of requests to dequeue may also be based on the type of request, such as whether the request is a read command or a write command, since one type of command may take longer than another type of command to perform. The type of cache request or command can be determined, for example, by identifying an opcode from a cache message or packet including the cache request.

Figure 2B:
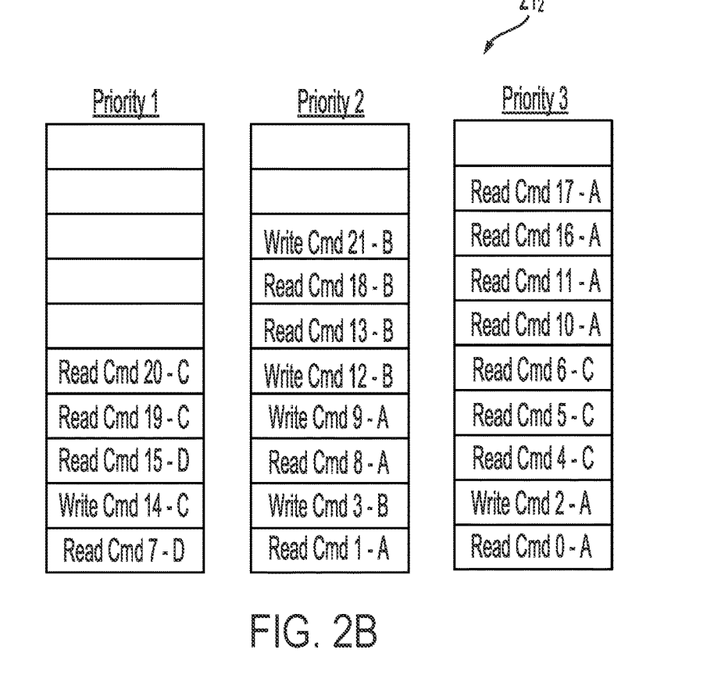
FIG. 2B illustrates an example of queuing remote and local cache requests based on priorities of the cache requests according to one or more embodiments.

FIG. 2B illustrates an example of queuing remote and local cache requests based on priorities of the requests according to one or more embodiments. As shown in FIG. 2B, I/O queues $21_2$ include three I/O queues for cache requests that have three different priorities. As noted above, the use of different I/O queues for different priorities or QoS can improve the overall QoS of the distributed cache. This can ensure that cache requests for real-time applications, such as video applications, can be dequeued from the higher priority I/O queue before one or more lower priority cache requests even if the lower priority request was received before the higher priority request was received.

In some implementations, a program executed in a kernel space of the node (e.g., program $12A_1$ or $12B_1$ in FIG. 1) can determine the relative priorities or a QoS indicator for cache requests that have been received within a predetermined window of time and establish different queues for the different priorities. For example, the program may identify a priority field of a command, such as an 802.1Q tag in an Ethernet header as part of the IEEE 802.1Qbb Priority-based Flow Control (PFC) standard, and use this priority field to create I/O queues and identify the corresponding I/O queue for queuing cache requests based on their relative priorities.

The cache requests in a higher priority I/O queue (e.g., the priority 1 queue in FIG. 2B) can be dequeued for performance more frequently than another command in a lower priority I/O queue (e.g., priority 2 or priority 3 queues in FIG. 2B). In some implementations, a greater number of cache requests can be dequeued from the higher priority I/O queues in each round of dequeuing cache requests for performance as compared to the lower priority I/O queues. In addition, the program in the kernel space may consider whether the cache request is a read command or a write command when determining the number of cache requests to dequeue, since one command type, such as write commands, may take longer to perform than another command type, such as read commands. The program in the kernel may additionally or alternatively consider the application that initiated the cache request so that the cache requests are dequeued in groups for the same application to reduce the number of context switches when notifying a user space application about the performance of the cache requests. In the example of FIG. 2B, the program may sequentially dequeue commands 12, 13, 18, and 21 initiated by application B in one round, and only sequentially dequeue commands 8 and 9 initiated by application A in the previous round. As noted above, the program may also consider a sequence number for the cache requests so that related requests are performed in sequence.

Figure 2C:
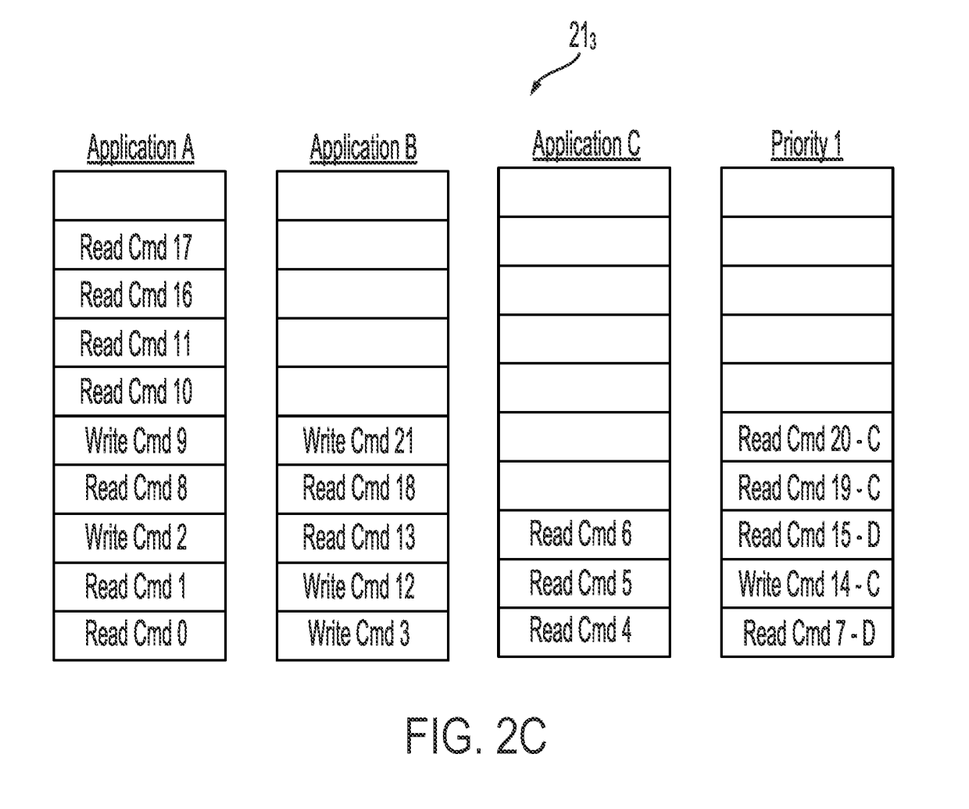
FIG. 2C illustrates an example of queuing remote and local cache requests based on the applications initiating the requests and the priorities of the cache requests according to one or more embodiments.

FIG. 2C illustrates an example of queuing remote and local cache requests based on the applications initiating the requests and the priorities of the requests according to one or more embodiments. This arrangement can provide a hybrid approach between the examples of FIGS. 2A and 2B to prevent the blocking of applications that initiate cache requests less frequently and still allow high priority or more time-sensitive requests to be dequeued sooner than if such cache requests remained in an I/O queue for their respective initiating application.

As shown in FIG. 2C, I/O queues $21_3$ include three I/O queues for cache requests initiated by applications A, B, and C, and one I/O queue for high priority cache requests that may come from any application. Read commands 7 and 15 are initiated by application D, which does not need a separate I/O queue at this time since all the cache requests from application D are high priority. In response to receiving a cache request from application D that is not high priority, the program in the kernel can create a new I/O queue in the kernel for requests initiated by application D.

In some implementations, the program in the kernel space can dequeue more cache requests from the high priority queue as compared to the application-based I/O queues for each round or cycle of dequeuing cache requests from the I/O queues. As with the I/O queuing approaches discussed above for FIGS. 2A and 2B, the program in the kernel space may consider whether the cache request is a read command or a write command when determining the number of cache requests to dequeue, since one command type such as write commands may take longer to perform than another command type, such as read commands. When dequeuing cache requests from the high priority I/O queue, the program in the kernel may additionally or alternatively consider the application that initiated the cache request so that the cache requests are dequeued in groups for the same application or by sequence numbers to improve the notification of the performance of the commands to a user space application.

The number I/O queues and the types of I/O queues (e.g., priority-based or application-based) can change during operation of the node to better suit the applications accessing the shared cache and the resources available at the node. For example, additional I/O queues can be added for new applications accessing the shared cache and I/O queues can be removed for inactive applications. As another example, the detection of a different priority indication in received cache requests can result in the creation of a new high priority I/O queue. In other examples, if the number of applications accessing the shared cache or the traffic of cache requests exceeds a threshold, the I/O queues may instead only consider priority to conserve the processing and memory resources of the kernel as compared to having separate I/O queues for each application. In such cases, the program in the kernel may need to reorganize the pending cache requests into the new I/O queues.

Example Processes

Figure 3:
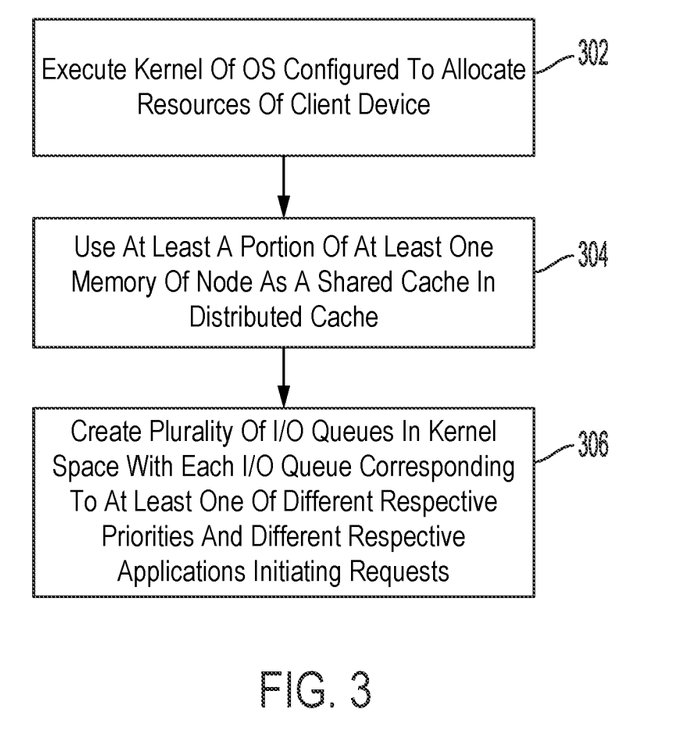
FIG. 3 is a flowchart for an Input/Output (I/O) queue creation process according to one or more embodiments.

FIG. 3 is a flowchart for an I/O queue creation process according to one or more embodiments. The process of FIG. 3 may be performed by, for example, processor 106A of node 104A in FIG. 1 executing program $12A_1$ or processor 107B of smart NIC 108B executing program $12B_1$. The I/O queue creation process may be performed periodically during operation of the node or may be performed in response to a change in a condition, such as the number of active applications accessing the shared cache exceeding a threshold number of applications.

In block 302, a kernel of an OS is executed by a processor to allocate resources of a node. In implementations where the processor executes a kernel for a smart NIC (e.g., NIC OS kernel 10B in FIG. 1), the processor may use the OS to allocate resources of the smart NIC and the memory or storage that it controls.

In block 304, at least a portion of at least one memory of the node is used as a shared cache in a distributed cache (e.g., shared cache 20A or 20B in FIG. 1). The distributed cache can include respective shared caches of other nodes on a network.

In block 306, the processor uses the kernel to create a plurality of I/O queues in the kernel space with each I/O queue corresponding to at least one of different respective priorities and different respective applications initiating requests. With reference to the example of FIGS. 2A to 2C discussed above, the created I/O queues can be based on the number of applications that have accessed the shared cache within a predetermined period of time and/or relative priorities of cache requests received by the at least one processor.

Those of ordinary skill in the art will appreciate with reference to the present disclosure that the blocks for the in-kernel I/O queue creation process of FIG. 3 may differ in other implementations. For example, some or all of blocks 302, 304, and 306 may be performed concurrently.

Figure 4:
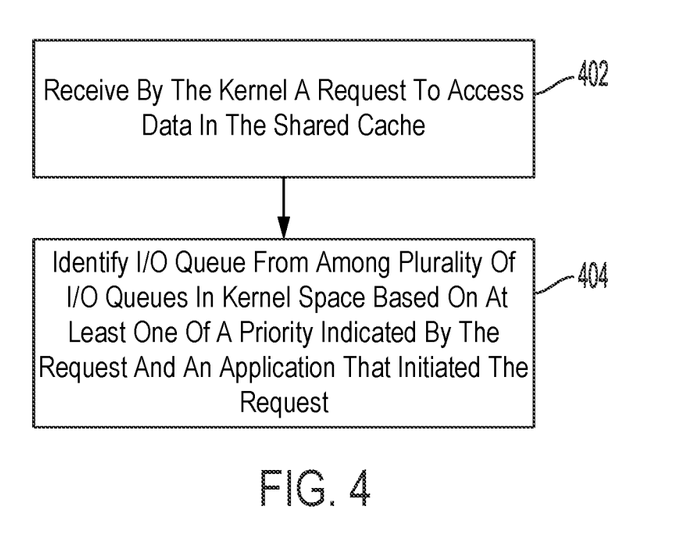
FIG. 4 is a flowchart for an I/O queue identification process according to one or more embodiments.

FIG. 4 is a flowchart for an I/O queue identification process according to one or more embodiments. The process of FIG. 4 may be performed by, for example, processor 106A of node 104A in FIG. 1 executing program $12A_2$ or processor 107B of smart NIC 108B executing program $12B_2$.

In block 402, the kernel receives a request to access data in the shared cache. The request can include, for example, a read command or a write command for data in the shared cache. In some implementations, a program executed in the kernel can identify the request as a cache request for data in the shared cache by parsing the request to identify, for example, a logical address or other identifier (e.g., namespace ID) indicating an operation for data stored in the shared cache. The request may be received from an application executing at the same node as the shared cache or may be received from an application executing at a different node via a network.

In block 404, the program identifies an I/O queue from among the plurality of I/O queues in the kernel space based on at least one of a priority indicated by the request and an application that initiated the request. As noted above, the program may parse a cache message or packet received by the kernel to determine an application identifier (e.g., application ID) and/or a priority indication for the request. For the application identifier, the program may identify the application initiating the request using, for example, a port number for the application and an address for the node executing the application (e.g., a MAC address). For priority, the program may use a priority field of the cache message or packet, such as an 802.1Q tag in an Ethernet header as part of the IEEE 802.1Qbb PFC standard.

Those of ordinary skill in the art will appreciate with reference to the present disclosure that other implementations of the example I/O queue identification process of FIG. 4 may differ. For example, in other implementations the program may also determine whether the cache request is used to read or write data in the shared cache, such as by identifying an opcode in the cache message or packet and keep track of cache requests that should be dequeued together.

Figure 5:
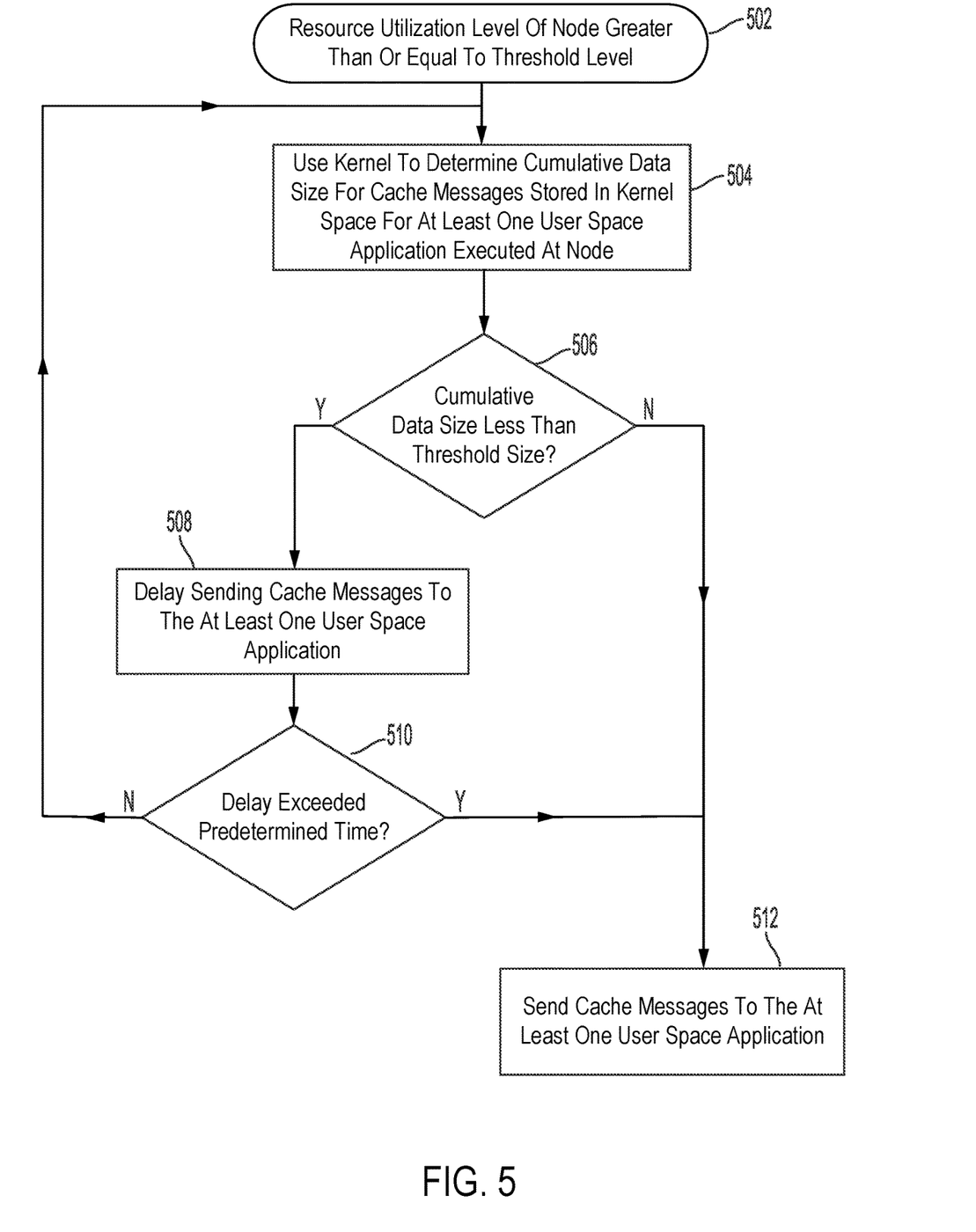
FIG. 5 is a flowchart for a cache message batching process according to one or more embodiments.

FIG. 5 is a flowchart for a cache message batching process according to one or more embodiments. The process of FIG. 5 may be performed by, for example, processor 106A of node 104A in FIG. 1 executing program $12A_3$ or processor 107B of smart NIC 108B executing program $12B_3$. The cache messages can correspond to cache requests in the I/O queues (e.g., cache requests in I/O queues 21 in FIG. 1) and/or cache messages for data or results stored in one or more completion queues after accessing the shared cache (e.g., data stored in completion queues 18 in FIG. 1).

In certain conditions, the kernel may delay sending cache messages to a user space application until a threshold data size for the cache messages has been accumulated in the kernel space. This batching of cache messages can reduce the number of interrupts and context switching in the user space by notifying the user application less frequently for the batched or grouped cache messages as compared to individually sending each cache message to the user space.

In block 502, the cache request batching process is triggered or initialized when a resource utilization level of the node is greater than or equal to a threshold level. In this regard, the batching of cache messages may only be used when delaying the cache messages will not introduce much additional delay. For example, if processing resources of the node are less than a threshold level (e.g., the processor or processors used by the user space applications are not fully scheduled) and/or the frequency of cache messages to be sent is less than a threshold frequency, the batching of the sending of cache messages to the user space may not be advantageous since the batching would introduce delay when resources are otherwise available for handling the cache messages in the user space.

In block 504, the program executed by the kernel determines the cumulative data size for cache messages stored in the kernel space for at least one user space application executed by the node. In some implementations, the cumulative data size may be determined for each user space application to receive the cache messages. In other implementations, the cumulative data size may be determined for multiple user space applications to receive cache messages. The data size may include, for example, data read from the shared cache and stored in a completion queue of the kernel space, results from operations performed by the kernel on data read from the shared cache, data to be transferred to a user space application that is received from a remote node or results of operations performed on such data, and/or notifications of accesses of the shared cache or a remote shared cache.

In block 506, it is determined whether the cumulative data size is less than a threshold data size. The threshold data size may be set on a per user space application basis in implementations where the cumulative data size is determined in block 504 for each application. In other implementations, the threshold data size may be set for all data stored in the kernel space for the cache messages to be sent to the user space applications. The threshold data size may be based on an available storage capacity in the kernel space that is designated for storing data to be sent to the user space.

If the cumulative data size is less than the threshold size in block 506, the program in the kernel space delays sending the cache messages to the at least one user space application in block 508. In block 510, it is determined whether the delay has exceeded a predetermined time, which can be based on, for example, a maximum latency or time out value for processing requests for an active application with a highest QoS requirement (e.g., a lowest timeout value for performing commands). The predetermined time may be set as a lower value than a timeout value or QoS requirement to ensure the delay caused by the batching does not exceed such application requirements.

If the delay has not exceeded the predetermined delay in block 510, the batching process returns to block 504 to determine a new cumulative data size for the cache messages that have been accumulated in the kernel space. On the other hand, if the delay has exceeded the predetermined delay in block 510, the batching process proceeds to block 512 to send the batched cache messages to one or more user space applications. As noted above, such batching of cache messages to the user space can improve the efficiency of the utilization of processing resources by the user space applications since less interrupts are required as compared to not batching the cache messages from the kernel to the user space applications.

Those of ordinary skill in the art will appreciate with reference to the present disclosure that other implementations of the example cache message batching process of FIG. 5 may differ. For example, in some implementations the batching process may be interrupted at any time to send the accumulated cache messages based on the resource utilization of the node, such as the processing resources falling below the threshold level in block 502 or an available memory for the kernel space falling below a threshold size.

Figure 6:
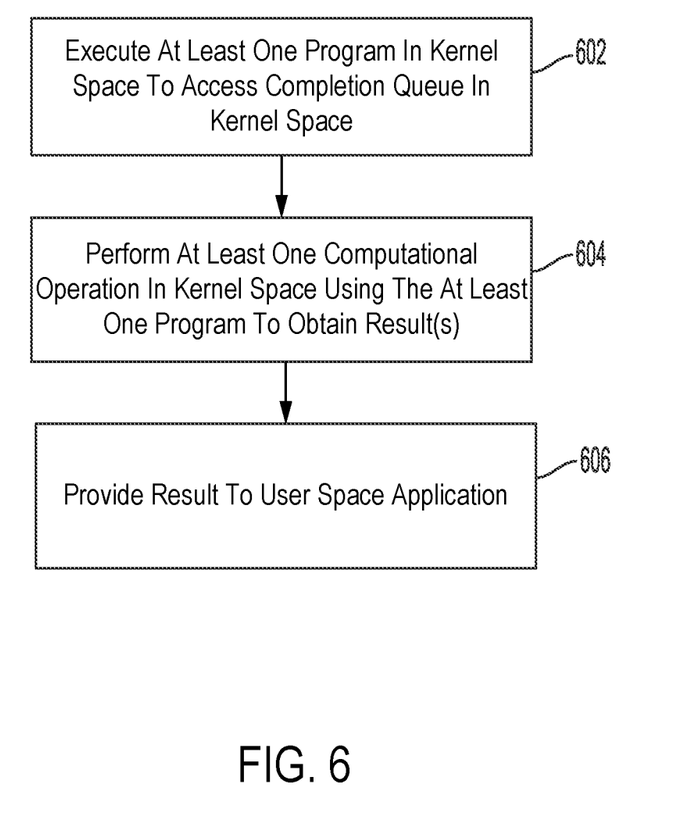
FIG. 6 is a flowchart for an in-kernel computational operation process according to one or more embodiments.

FIG. 6 is a flowchart for an in-kernel computational operation process according to one or more embodiments. The process of FIG. 6 may be performed by, for example, processor 106A of node 104A in FIG. 1 executing one or more fixed programs 14A or processor 107B of smart NIC 108B executing one or more fixed programs 14B.

In block 602, at least one program is executed in the kernel space to access one or more completion queues stored in the kernel space. The completion queues can store data that has been retrieved from the shared cache of the node.

In block 604, the at least one program performs at least one computational operation in the kernel space to obtain one or more results. The at least one computational operation can include, for example, at least one of compression of the data, decompression of the data, encryption of the data, decryption of the data, a scatter-gather operation for the data, and a data deduplication process for the data. By performing such computational operations in the kernel space, it is possible to further reduce the amount of cache messages between the kernel and the user space applications and further improve processing efficiency of the node.

In block 606, the result from the at least one computational operation is provided to the user space application. In some cases, the result may be batched using a cache message batching process such as the example process of FIG. 5.

The foregoing use of application-based and/or priority-based I/O queues can provide a dynamic adjustment of I/O queuing to prevent applications from blocking cache access of other applications and meet the diverse requirements of different applications accessing a shared cache. In addition, the in-kernel I/O request queuing can reduce the latency in accessing the shared cache since the data does not need to be processed through the full network and I/O stacks of the kernel for queuing in a user space. The in-kernel batching of cache messages and performing computational operations in the kernel can further improve the usage of processing resources by requiring less interactions between the kernel space and the user space.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A node, comprising:
   at least one memory configured to be used at least in part as a shared cache in a distributed cache;
   a network interface configured to communicate with one or more other nodes in a network, the one or more other nodes each configured to provide a respective shared cache for the distributed cache; and
   at least one processor configured, individually or in combination, to:
      execute a kernel of an Operating System (OS) configured to allocate resources of the node;
      receive, by the kernel, a request to access data in the shared cache of the at least one memory; and
      identify an Input/Output (I/O) queue from among a plurality of I/O queues in a kernel space of the at least one memory for queuing the received request for performance based at least in part on a priority indicated by the received request.

2. The node of claim 1, wherein the at least one processor is further configured, individually or in combination, to create the plurality of I/O queues in the kernel space of the at least one memory, wherein each I/O queue of the plurality of I/O queues corresponds to at least one of different respective priorities for requests to access data in the shared cache and different respective applications initiating requests to access data in the shared cache.

3. The node of claim 2, wherein the different respective applications initiating the requests are executed by the node and at least one other node on the network.

4. The node of claim 1, wherein the network interface is further configured to communicate with the one or more other nodes on the network using NVMe Over Fabric (NVMeOF).

5. The node of claim 1, wherein the at least one processor is further configured, individually or in combination, to identify the queue by using an extended Berkeley Packet Filter (eBPF) program.

6. The node of claim 1, wherein the at least one processor is further configured, individually or in combination, to:
   use the kernel to determine that a resource utilization level of the node is greater than or equal to a threshold level; and
   in response to determining that the resource utilization level of the node is greater than or equal to the threshold level:
      use the kernel to determine a cumulative data size for cache messages stored in the kernel space for at least one user space application executed by the node;
      determine whether the cumulative data size is less than a threshold size; and
      in response to determining that the cumulative data size is less than the threshold size, delay sending the cache messages to the at least one user space application.

7. The node of claim 6, wherein the at least one processor is further configured, individually or in combination, to:
   determine that the delay in sending the cache messages has exceeded a predetermined time; and
   in response to determining that the delay in sending the cache messages has exceeded the predetermined time, send the cache messages to the at least one user space application.

8. The node of claim 1, wherein the at least one processor is further configured, individually or in combination, to:
   execute at least one program in the kernel space of the at least one memory to use data stored in a completion queue in the kernel space to perform at least one computational operation to obtain a result; and
   provide the result to a user space application.

9. The node of claim 8, wherein the at least one computational operation includes at least one of compression of the data, decompression of the data, encryption of the data, decryption of the data, a scatter-gather operation for the data, and a data deduplication process for the data.

10. A method, comprising:
    executing a kernel of an Operating System (OS) configured to allocate resources of a node;
    using at least a portion of at least one memory of the node as a shared cache in a distributed cache, wherein the distributed cache includes respective shared caches of one or more other nodes on a network; and
    creating a plurality of Input/Output (I/O) queues in a kernel space of the at least one memory, wherein each I/O queue of the plurality of I/O queues corresponds to at least one of different respective priorities for requests to access data in the shared cache and different respective applications initiating requests to access data in the shared cache.

11. The method of claim 10, wherein the different respective applications initiating the requests are executed by the node and at least one other node on the network.

12. The method of claim 10, further comprising:
    receiving, by the kernel, a request to access data in the shared cache of the at least one memory; and
    identifying an I/O queue from among the plurality of I/O queues in the kernel space for queuing the received request for performance based on at least one of a priority indicated by the received request and an application that initiated the request at either the node or at the one or more other nodes.

13. The method of claim 10, further comprising using the kernel to parse a request received from a different node on the network to determine at least one of a priority of the request and an application that initiated the request at the different node.

14. The method of claim 10, further comprising creating the plurality of I/O queues in the kernel space by using an extended Berkeley Packet Filter (eBPF) program.

15. The method of claim 10, further comprising:
    using the kernel to determine that a resource utilization level of the node is greater than or equal to a threshold level; and in response to determining that the resource utilization level of the node is greater than or equal to the threshold level:
    using the kernel to determine a cumulative data size for cache messages stored in the kernel space for at least one user space application executed by the node;
    determining whether the cumulative data size is less than a threshold size; and
    in response to determining that the cumulative data size is less than the threshold size, delaying sending the cache messages to the at least one user space application.

16. The method of claim 15, further comprising:
determining that the delay in sending the cache messages has exceeded a predetermined time; and
in response to determining that the delay in sending the cache messages has exceeded the predetermined time, sending the cache messages to the at least one user space application.

17. The method of claim 10, further comprising:
executing at least one program in the kernel space of the at least one memory to use data stored in a completion queue in the kernel space to perform at least one computational operation to obtain a result; and
providing the result to a user space application.

18. The method of claim 17, wherein the at least one computational operation includes at least one of compression of the data, decompression of the data, encryption of the data, decryption of the data, a scatter-gather operation for the data, and a data deduplication process for the data.

19. A node, comprising:
at least one memory configured to be used at least in part as a shared cache in a distributed cache;
a network interface configured to communicate with one or more other nodes in a network, the one or more other nodes each configured to provide a respective shared cache for the distributed cache;
means for executing a kernel of an Operating System (OS) configured to allocate resources of the node;
means for receiving, by the kernel, a request to access data in the shared cache of the at least one memory;
means for identifying an Input/Output (I/O) queue from among a plurality of I/O queues in a kernel space of the at least one memory for queuing the received request for performance based on at least one of a priority indicated by the received request and an application that initiated the request;
means for executing at least one program in the kernel space of the at least one memory to use data stored in a completion queue in the kernel space to perform at least one computational operation to obtain a result; and
means for providing the result to a user space application.

20. The node of claim 19, further comprising means for creating the plurality of I/O queues in the kernel space of the at least one memory, wherein each I/O queue of the plurality of I/O queues corresponds to at least one of different respective priorities for requests to access data in the shared cache and different respective applications initiating requests to access data in the shared cache.

* * * * *